United States Patent [19]
Chittofrati et al.
[11] Patent Number: 5,045,158
[45] Date of Patent: Sep. 3, 1991

[54] ELECTRICALLY CONDUCTIVE WATER/OIL MICROEMULSIONS OF THE WATER-IN-OIL TYPE BASED ON PERFLUORINATED COMPOUNDS AND USED AS A CATHOLYTE IN ELECTROCHEMICAL PROCESSES

[75] Inventors: Alba Chittofrati, Milan; Angelo Tentorio, Novara; Mario Visca, Alessandria, all of Italy

[73] Assignee: Ausimont S.r.L., Milan, Italy

[21] Appl. No.: 367,860

[22] Filed: Jun. 19, 1989

[30] Foreign Application Priority Data

Jun. 17, 1988 [IT] Italy ............................ 21004 A/88

[51] Int. Cl.[5] ............................ C25B 1/00

[52] U.S. Cl. ............................ 204/98; 204/101; 204/292; 429/190

[58] Field of Search ............... 204/98, 12 C, 292, 101; 429/190

[56] References Cited

U.S. PATENT DOCUMENTS 3,048,549 8/1962 Adams ............................ 429/190
4,012,329 3/1977 Hayes et al. ..................... 252/8.515
4,853,097 1/1989 Marchionni et al. ............ 204/157.6

FOREIGN PATENT DOCUMENTS 0280312 8/1988 European Pat. Off. .
0315841 5/1989 European Pat. Off. .
0340740 11/1989 European Pat. Off. .

*Primary Examiner*—John F. Niebling
*Assistant Examiner*—Kathryn Gorgos
*Attorney, Agent, or Firm*—Morgan & Finnegan

[57] ABSTRACT

An electrochemical process, in which a gaseous matter is reduced at the cathode and in which microemulsions of the water-in-oil (w/o) type are utilized as catholytes, the microemulsions having ionic electric transfer and matter interphase transfer capacities, and in which the oil phase consists of a perfluoropolyether having perfluoroalkyl end groups or functional end groups of the hydrophilic type, or of perfluorocarbons, the microemulsions being obtained by the use of perfluorinated surfactants, in particular those having a perfluoroalkylpolyether structure and/or by the use of an alcohol as a co-surfactant.

12 Claims, 1 Drawing Sheet

ELECTRICALLY CONDUCTIVE WATER/OIL MICROEMULSIONS OF THE WATER-IN-OIL TYPE BASED ON PERFLUORINATED COMPOUNDS AND USED AS A CATHOLYTE IN ELECTROCHEMICAL PROCESSES

DESCRIPTION OF THE INVENTION

1. Field of the Invention

The present invention relates to the use of water-in-perfluorinated oil (w/o) microemulsions as a catholyte in electrolytic processes. In particular, the perfluorinated oils are of the perfluoropolyether type.

2. Background of the Invention

The necessity was felt to have available electrochemical processes in which it is possible to obtain a high current density with the minimum cell voltage, for example, by reducing the hydrogen discharge overvoltage thanks to the use of catalyzed electrodes as a cathode.

A possible alternative is represented by a cathodic reaction which—the anodic reaction being equal—should occur at a lower reversible potential difference value.

It is well known from electrochemical processes, in particular from voltametry, how a gas-saturated (for example an $O_2$-saturated) saline aqueous solution exhibits its limit values of the reducing current of said gas as a function of the temperature and of the angular revolving speed ($\omega$) of the working electrode, which are determined by the low solubility of the gas in the electrolyte. Conversely, the $H_2$ evolution current is solely a function of the potential and of the temperature, as the reduction of $H^+$ ions to $H_2$ is substantially independent of the diffusion and, therefore, independent of $\omega$.

DETAILED DESCRIPTION OF THE INVENTION

In accordance with the present invention it has, surprisingly, been found that by carrying out voltametric processes on the w/o microemulsions of the present invention, having an electrical conductance preferably of at least 1 milliS.cm$^{-1}$, the gas-diffusion limit current density which reduces at the cathode is much higher than the diffusion current of the same gas in an aqueous saline solution, when operating at the same temperature and at the same rotational speed of the electrode.

A further surprising aspect of the present invention is that—the current density and the anodic process being equal—the difference between the cathodic potential of a process in a microemulsion (for example the reduction of $O_2$ to $OH^-$) and the cathodic potential of a reference process in an aqueous solution (typically the $H_2$ evolution) is such that the electrolysis in microemulsion permits one to save power as compared to the electrolysis in aqueous phase.

At the limit, in the microemulsion, it is possible to observe the passage of a considerable current supported by the oxygen reduction to cathodic potentials, at which no $H^{30}$ discharge is observed in the reference solution.

It is apparent that it is necessary to compare—under the same current conditions—the $O_2$ reduction cathodic process in microemulsion with the $H_2$ evolution in aqueous solution, as the $O_2$ reduction in aqueous solution can occur only at a low current density, limited by the low solubility of the gas and, in consequence, of the diffusion process.

The results described above appear particularly surprising and unexpected if it is borne in mind that the microemulsions according to the present invention are of the w/o type, i.e., where oil is the continuous phase and water is the dispersed phase Thus, an object of the present invention is an electrochemical process wherein a gaseous matter is reduced at the cathode and wherein water-in-oil (w/o) microemulsions having an electrical conductance (due to ionic transfer) of at least 1 millisiemens.cm$^{-1}$ are utilized as a catholyte.

In particular, microemulsions of water in perfluoropolyethers or perfluorocarbons having an electrical conductance of at least 1 millisiemens.cm$^{-1}$ are used as catholytes for the cathodic reduction of oxygen.

The microemulsions of the present invention have been described in Italian patent applications Nos. 20,910 A/86, 19,494 A/87, 19,495 A/87 (w/o and o/w microemulsions of perfluoropolyethers) and 22,421 A/87 (conductive microemulsions).

Whenever used in the present application, the term "microemulsion" includes also systems in which the molecular orientation in the interphase leads to the formation of non-optically isotropic systems, characterized by double refraction and probably consisting of oriented structures of the liquid-crystalline type (liquid crystals).

The microemulsions of the present invention are mixtures which macroscopically consist of only one limpid or opalescent phase, which is indefinitely stable in the operative temperature range, said mixtures comprising:

(a) an aqueous liquid optionally containing one or more electrolytes;

(b) a fluid with perfluoropolyether structure having perfluoroalkyl or functional end groups, with carboxylic, alcoholic, polyoxyalkylene-OH, ester, amide, etc. functionality, and preferably hydrophilic functional groups, such as carboxylic and polyoxyalkylene-OH groups, and in particular the carboxylic group;

(c) a fluorinated surfactant, preferably having a perfluoropolyether structure; and/or:

a hydrogenated alcohol $C_1$14 $C_{12}$, preferably $C_1$–$C_6$, and, optionally, a fluorinated alcohol (co-surfactanct).

The microemulsions of the present invention may be optically isotropic or birefractive, are of the water-in-oil (w/o) type, and are characterized in that they are conductive, their conductance being at least 1 milliS.cm$^{-1}$.

Since the microemulsions of the present invention are of the w/o type, they must contain the PFPE as a "continuous phase," and, therefore, the PFPE phase should be in excess (as to volume) with respect to the aqueous phase.

BRIEF DESCRIPTION OF THE DRAWING

Both the existence of w/o microemulsions and the conductance characteristics are not expectable "a priori", and, therefore, the microemulsions of the present invention may be preferably described, in general, as the conductive portion of the single-phase areas which are present in the right half of a water/surfactant system/PFPE ternary diagram represented as shown in the accompanying FIG. 1.

Figure 1:
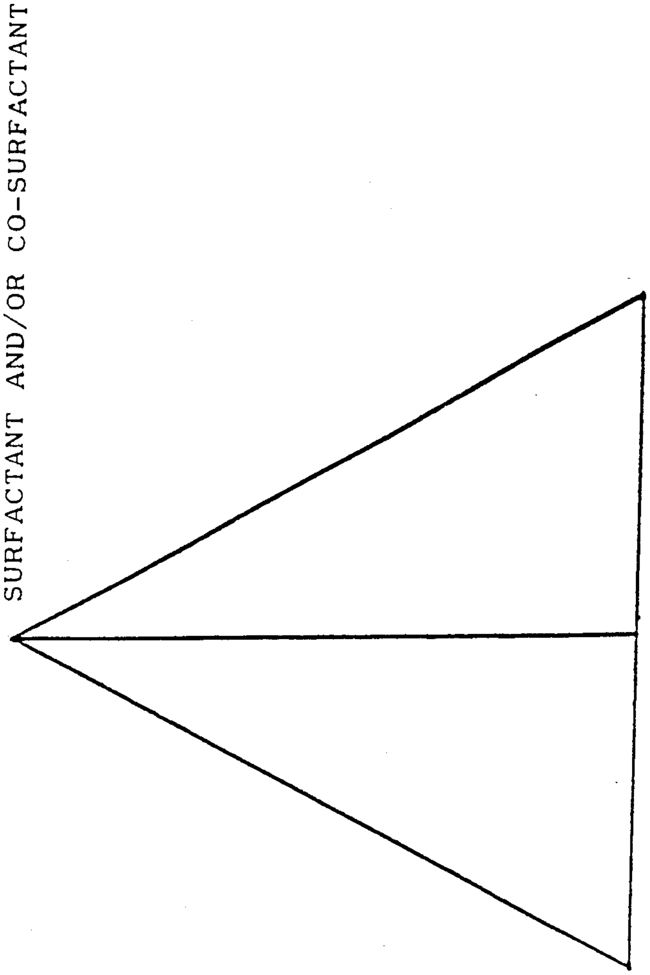
In FIG. 1, the bisecting line of the angle opposite the water-PFPE base side is characterized by a W/PFPE constant ratio equal to 1.

In principle, however, it is not possible to exclude the presence of single-phase conductive areas of the w/o type also with a W/PFPE ratio higher than 1, due to the impossibility of foreseeing the existence of such systems.

The fact that the water-in-perfluoropolyether microemulsions are within the scope of the present invention may be easily ascertained by a technician skilled in the art by means of a simple measurement of the electrical conductance as indicated hereinabove.

Perfluoropolyethers (PFPE) suitable for forming the microemulsions of the present invention are:

(a) PFPE having an average molecular weight ranging from 500 to 10,000, preferably from 600 to 6,000, having perfluoroalkyl end groups and belonging to one or more of the following classes:

(1)

$$R_fO(\underset{\displaystyle CF_3}{CF}-CF_2O)_n)\underset{\displaystyle CF_3}{CFO})_m(CF_2O)_pR'f$$

with a random distribution of the perfluorooxyalkylene units, wherein $R_f$ and $R'_f$, alike or different from each other, are $—CF_3$, $—C_2F_5$, $—C_3F_7$, and m, n, p have such means values as to meet the above average molecular weight (m.w.) requirements.

(2)

$$R_fO(CF_2CF_2O)_n(CF_2O)_mR'_f$$

with a random distribution of the perfluorooxyalkylene units, where $R_f$ and $R'_f$, alike or different from each other, are $—CF_3$ or $—C_2F_5$, and m and n have such mean values as to meet the above m.w. requirements.

(3)

$$R_fO(CF_2CF_2O)_n(CF_2O)_m(\underset{\displaystyle CF_3}{CFO})_p(\underset{\displaystyle CF_3}{CF}-CF_2O)_q-R'f$$

with a random distribution of the perfluorooxyalkylene units, where $R_f$ and $R'_f$, alike or different from each other, are $—CF_3$, $—C_2F_5$, or $—C_3F_7$, and m, n, p, q have such mean values as to meet the above m.w. requirements.

(4)

$$R_fO(\underset{\displaystyle CF_3}{CF}-CF_2O)n-R'_f$$

where $R_f$ and $R'_f$, alike or different from each other, are $—C_2F_5$ or $—C_3F_7$, and n has such a mean value as to meet the above m.w. requirements.

(5)

$$R_fO(CF_2CF_2O)_nR'_f$$

where $R_f$ *and* $R'_f$, alike or different from each other, are $—CF_3$, $—C_2F_5$, and n has such a mean value as to meet the above m.w. requirements.

(6)

$$R_fO(CF_2CF_2CF_2O)_nR'_f$$

where $R_f$ and $R'_f$, alike or different from each other, are $—CF_3$, $—C_2F_5$ or $—C_3F_7$, n having such a mean value as to meet the above m.w. requirements.

(7) PFPE having the structure of class 1 or class 3, in which one of the two end groups $R_f$ and $R'_f$, contains one or two chlorine atoms, as described in the commonly-owned Italian patent application No. 20,406 A/88.

(b) PFPE belonging to the above classes, having an average molecular weight ranging from 1,500 to 10,000, and preferably lower than 6,000, characterized in that they contain on the average from 0.1 to 4 non-perfluoroalkyl end groups per polymeric chain, and preferably from 0.3 to 1.

(c) Perfluoropolyethers described in the commonly-owned Italian patent application No 20,346 A/86, having functional groups along the perfluoropolyether chain and end groups of the perfluoroalkyl or functional type.

As non-perfluoroalkyl end groups and as functional groups in the chain are meant, for example, carboxylate, alcoholic, polyoxyalkylene-OH, etc., groups.

Most suitable functional end groups or functional groups in the chain are those of the hydrophilic type, and in particular the carboxylic group.

The functional end groups or the functional groups in the chain, of the above type, may be linked to the perfluoropolyether chain through a —CFX— group in which X is F or $CF_3$, optionally followed by a linking group consisting of a divalent non-fluorinated radical of the alkylene or arylene type, containing up to 20 carbon atoms, preferably containing 1 to 8 carbon atoms, according to the sequence: perfluoropolyether chain-CFX-non-fluorinated radical-functional group.

It is to be understood that the perfluoropolyethers to be used according to the present invention are also those of classes 1, 2 and 3 having acid end groups, which are obtained as rough products of the photo-oxidation process utilized for synthesizing the above PFPE.

Perfluoropolyethers of class (1) are commercially known under the trademark Fomblin® Y or Galden®.

Those of class (2) are commercially known under the trademark Fomblin® Z, all of them being produced by Montedison S.p.A.

The products of class (3) are prepared according to U.S. Pat. No. 3,665,041.

Commercially known products of class (4) are the Krytox (Dupont).

The products of class (5) are described in U.S. Pat. No. 4,523,039.

The products of class (6) are described in European patent EP 148,482 to Daikin.

Other suitable perfluoropolyethers are those described by Lagow et al. in U.S. Pat. No. 4,523,039 or in J. Am. Chem. Soc. 1985, 107, 1197-1201.

The fluorinated surfactants contained in the microemulsions of the present invention may be ionic or non-ionic. In particular, the following may be cited:

(a) salts of pacarboxylic acids having 5 to 11 carbon atoms;

(b) salts of perfluorosulphonic acids having 5 to 11 carbon atoms;

(c) non-ionic surfactants indicated in European patent application No. 0,051,526, and consisting of a perfluoroalkylene chain and a polyoxyalkylene hydrophilic head;

(d) salts of mono- and di-carboxylic acids derived from perfluoropolyethers; and (e) non-ionic surfactants consisting of a perfluoropolyether chain linked to a polyoxyalkylene chain.

The preferred surfactants are those of the ionic type.

Furthermore, the system may contain one or more co-surfactants belonging to one of the following classes:

hydrogenated alcohols having 1 to 12 carbon atoms;

alcohols containing a perfluoropolyether chain;

partially fluorinated alcohols.

The aqueous liquid may consist of water or an aqueous solution of inorganic electrolytes (salts, acids, or alkalies).

The w/o microemulsions of the present invention which are utilizable as a catholyte for gas cathodic reduction reactions may also comprise, as a continuous oily phase, a perfluorocarbon instead of a perfluoropolyether, on condition that preferably such microemulsion has a conductance of at least 1 (millisiemen.cm$^{-1}$.

Perfluorocarbon microemulsions are well known in the art—see for example European patent application No. 51,526.

However, the use of w/o conductive microemulsions, in which the oil is a perfluoropolyether, is particularly preferred.

The microemulsions to be used as a catholyte are prepared by mixing the individual components and they may be identified for example by measuring the specific conductance (X) variation of the oil/surfactant/co-surfactant system upon varying the composition by the addition of a water solution.

In practice, a sample containing a surfactant (and optionally a co-surfactant) in PFPE is titrated with small amounts of aqueous phases, X being measured after each addition.

Thus, the possible presence of a composition range corresponding to significant X values is ascertained.

Once the composition corresponding to a sufficiently high X value has been identified, the conductive microemulsion may thereafter be prepared simply by mixing the individual components in any order.

According to the present invention, the use, as a catholyte, of w/o microemulsions having a conductivity equal to at least 1 milliS.cm$^{-1}$ relates to electrolytic reactions of any gas that can be reduced at the cathode. In particular, oxygen has been used, and, therefore, all the voltametric tests reported hereinafter and the corresponding evaluations will concern the cathodic reaction:

$$O_2 + 2H_2O + 4e \rightarrow 4OH^-$$

but it is to be understood that said evaluations are to be considered as illustrative and not limitative.

From the electrolysis in aqueous solution of $(NH_4)_2SO_4$, saturated with $O_2$, there were obtained the values of $O_2$-reduction diffusion limit-current as a function of temperature and angular rotational speed ($\omega$) of the working Pt electrode, and of the $H_2$ evolution current as a function of potential and temperature, as the $H^+$ reduction is substantially independent of the diffusion and, therefore, is independent of $\omega$.

Electrolyses are carried out by using, as a catholyte, the microemulsion ($\mu$E), at the same temperatures and at the same $\omega$, taking note of:

(1) $O_2$-diffusion limit-current density and increase of same with respect to the diffusion current of the same in an aqueous medium;

(2) cathodic potential difference—the current density being equal—between a cathodic process in microemulsion (typically $O_2$ reduction) and a reference cathodic process in aqueous solution (typically $H_2$ evolution).

The $O_2$-reduction limit current indicated in each example is always referred to as a cathodic potential which is lower by 200 mV than the value at which the $H_2$ evolution in the examined system begins.

In order to measure the current as a function of the applied potential, it was operated as an electrolysis, using as a catholyte various $\mu$E and as an anolyte an aqueous solution of concentrated inorganic electrolyte.

Electrolyses were conducted by means of a multipolarograph Amel 472, in a 3-electrode cell:

working electrode of the Pt rotating disc type, having a geometric surface area of 3.14 mm$^2$, immersed in $\mu$E;

Pt counter-electrode immersed in an aqueous solution of $(NH_4)_2SO_4$ (3 moles/liter), separated from the $\mu$E by an agar-agar septum; and reference calomel electrode (SCE) immersed in a saline bridge (KCl solution, 3 moles/1) with a Luggin capillary facing the working electrode surface.

The cathodic potential values reported hereinabove are referred to SCE.

In each test, about 60 ml of $\mu$E, at the desired temperature, were saturated with moist $O_2$ at atmospheric pressure.

Starting from the spontaneous potential of the system in the absence of current, a potential sweep—100 mV s$^{-1}$—was applied to the working electrode, and the circulating current was recorded as a function of the cathodic potential for different rotational speeds of the electrode.

In an aqueous solution of concentrated $(NH_4)_2SO_4$ (3 miles/liter, corresponding to 396 g/l) at a pH=5.3 and at a specific conductance of 172 milliS.cm$^{-1}$, $H_2$ evolution occurs at a cathodic potential higher than −700 mV (SCE).

In this case, the $O_2$-reduction limit current observed at 20° C. is equal to 2-3 $\mu$A mm$^{-2}$ in the absence of stirring, and is equal to 5 $\mu$A mm$^{-2}$ with $\omega$=1,500 rpm; at 40° C., 3 $\mu$A mm$^{-2}$ are obtained with $\omega$=0, and about 10 $\mu$A mm$^{-2}$ with $\omega$=1,500 rpm.

At 60° C. and without electrode rotation, the obtained limit-current density is 30 $\mu$M mm$^{-2}$.

As regards the comparison with the potentials at which the same cathodic current density is observed both in microemulsion and in electrolytic aqueous solution, such comparison was conducted at the same temperature and at a pH of the electrolytic aqueous solution as close as possible to the pH of an aqueous solution of the fluorinated surfactant utilized for preparing the microemulsion.

EXAMPLES

The examples given hereinbelow are to be considered as merely illustrative but not limitative of the present invention.

EXAMPLE 1

In 16 ml of doubly-distilled water, having a specific conductance of about 1 milliS.cm$^{-1}$, there were solubilized 28.12 perfluoropolyether (PFPE) having perfluoroalkyl end groups, belonging to class 1, exhibiting an average molecular weight of 650, in the presence of 57.30 g of ammonium salt of a monocarboxylic acid of perfluoropolyether structure belonging to class 1 and having a narrow molecular weight distribution and an equivalent weight of 724, and in the presence of 10.86 g of isopropyl alcohol.

The microemulsion (μE) so obtained had a specific conductance of 10.56 milliS.cm$^{-1}$ and conducted 14.3% by weight of dispersed aqueous phase.

From the voltametric diagrams obtained with this μE, it is possible to calculate, at a temperature of 20° C., an $O_2$-reduction limit current equal to 85 μA mm$^{-2}$ at $\omega=0$ and equal to 200 μA mm$^{-2}$ at $\omega=1500$ rpm, corresponding to a current about 40 times higher than that obtainable in an aqueous solution under the same conditions, for both tests.

At T=40° C., the $O_2$ reduction current was about 130 μA mm$^{-2}$ in the absence of stirring, and 250 μA mm$^{-2}$ at $\omega=1500$ rpm, corresponding to values respectively 40 and 25 times higher than those obtained in aqueous solution under the same conditions. It is possible to further enhance the current density in μE by means of a more intensive stirring: $\omega=3000$ rpm, in fact, 300 μA mm$^{-2}$ were obtained.

At T=60° C., 86 μA mm$^{-2}$ at $\omega=0$ and 260 μA mm$^{-2}$ at $\omega=1500$ rpm were circulating in μE, the value, in the absence of stirring, was three times the corresponding value in aqueous solution.

At 20° C. and at $\omega=1500$ rpm, the circulation of 200 μA mm$^{-2}$ at a cathodic potential of −550 mV in μE and at −850 mV in aqueous solution was obtained; this means that, the current density being equal, the electrolysis in microemulsion permits one to save about 35% of power in W, in particular, the saving in this case was 0.06 mV of power per mm$^2$ of electrodic surface with respect to the aqueous-phase electrolysis.

Always at $\omega=1500$ rpm and at 40° C., a circulation of 200 μA mm$^{-2}$ was obtained at −450 mV instead of at −750 mV, which are necessary in an aqueous solution, the power saving being 0.06 mW/mm$^2$.

EXAMPLE 2

Following the procedures described in the preceding example, a w/o μE was prepared which contained: 32.42 g of PFPE with perfluoroalkyl end groups, belonging to class 1 and having an average molecular weight of about 800; 12 ml of doubly-distilled water; 47.88 g of ammonium salt of a monocarboxylic acid having a perfluoropolyether structure belonging to class 1, exhibiting a narrow molecular weight distribution and an equivalent weight of 520; 20.99 g of a monofunctional alcohol having a perfluoropolyether structure and an average molecular weight of 678. By mixing the components at room temperature, a single-phase, limpid and isotropic system having X=2.99 milliS.cm$^{-1}$ and 10.6% of $H_2O$ was obtained.

From the voltametric diagrams obtained in this case, the following current density values, due to $O_2$ reduction, were determined:

At T=20° C., 80 μa mm$^{-2}$ in the absence of stirring and 120 μA mm$^{-2}$ at $\omega=1500$ rpm, such values being respectively 40 and 24 times higher than those obtained in aqueous solution;

At T=40° C., about 90 μA mm$^{-2}$ at $\omega=0$ and 185 μA mm$^{-2}$ at $\omega=1500$ rpm, the limit current values being respectively 30 and 19 times higher than the corresponding values in aqueous solution;

At T=60° C., about 75 μA mm$^{-2}$ at $\omega=0$ and 183 μA mm$^{-2}$ at $\omega=1500$ rpm, the value obtained without stirring being 2.5 times higher than the value obtained in aqueous solution.

A circulation of 200 μA mm$^{-2}$ with $\omega=1500$ rpm was observed:

At 40° C. at −680 mV in μE against −750 mV in aqueous solution, with a power saving of 0.014 mW/mm$^2$;

At 60° C. at −600 MV against −750 mV in aqueous solution, with a savings of 0.03 mW/mm$^2$.

EXAMPLE 3

The μE was prepared by mixing 55.59 g of a perfluoropolyether having perfluoroalkyl end groups belonging to class 1 and having an average molecular weight of 800, 4 ml of doubly-distilled water, 0.50 g of isopropyl alcohol, and 29.75 g of ammonium salt of a monocarboxylic acid with perfluoropolyether structure having a narrow molecular weight distribution and a mean equivalent weight of 692.

The limpid and isotropic system contained 4.5% by weight of water and had a specific conductance of 3.72 milliS.cm$^{-1}$ and a pH of about 5.5.

From the voltametric diagrams the following current density due to $O_2$ reduction were determined:

At T=20° C., there were circulating 90 μa mm$^{-2}$ without stirring and 126 μA mm$^{-2}$ at $\omega=1500$ rpm, said values being respectively 40 and 25 times higher than those obtained in aqueous solution under corresponding conditions;

At T=40° C., there were circulating 75 μA mm$^{-2}$ at $\omega=0$ and 200 μA mm$^{-2}$ at $\omega=1500$ rpm, said values being respectively about 40 and 20 times higher than the corresponding values obtained in aqueous solution;

At T=60° C., there were circulating 120 μA mm$^{-2}$ at $\omega=0$ and 215 μA mm$^{-2}$ at $\omega=1500$ rpm; in the absence of stirring therefore being obtained about quadruple of the current circulating in the aqueous electrolyte.

The circulation of 200 μA mm at $\omega=1500$ rpm was observed:

At T=40° C., at −700 mV against −750 mV in aqueous solution, with a saving of 0.01 μA mm$^{-2}$;

At T=60° C., at −600 mV against −750 mV in aqueous solution, with a saving of 0.03 μA mm$^{-2}$.

EXAMPLE 4

Prepared was a w/o μE containing 65.14 g of a PFPE having perfluoroalkyl end groups belonging to class 1, having an average molecular weight of 800, 34.87 g of ammonium salt of the same acids as was used in the preceding example, and 3 ml of water.

The system contained 3% of water and exhibited X=1.9 milliS.cm$^{-1}$. From the voltametric diagrams obtained with this μE saturated with moist $O_2$ the following was determined:

At 20° C., the $O_2$-reduction current density was 60 μA mm$^{-2}$ in the absence of stirring and 93μ mm$^{-2}$ at $\omega=1500$ rpm;

At 40° C., there were obtained about 100 μA mm$^{-2}$ at $\omega=0$ and 165 μA mm$^{-2}$ at $\omega=1500$ rpm.

The same μE saturated with moist $N_2$ did not show, at room temperature, an appraisable current circulation at a cathodic potential lower than −850 mV; for an Ec higher than −850 mV, $H_2$ evolution was observed.

EXAMPLE 5

To 40.5 ml of a perfluoropolyether having acid end groups belonging to class 1, having an average equivalent weight of 2860 with respect to the acid groups and an average visosimetric molecular weight of 2080, and consisting of a mixture of polymers having different molecular weights, neutralized with 13 ml of an ammonia solution at 10% by weight of $NH_3$, there were added 20 ml of doubly-distilled water, 4.5 ml of a carboxylic acid having an equivalent weight of 668, and 18 ml of a carboxylic acid having an equivalent weight of 361, both carboxylic acids having a perfluoropolyether structure and belonging to class 1.

The resulting system consisted of a single limpid phase, which was stable in the temperature range of from 25° to 75° C. and exhibited the following composition by weight:

rough perfluoropolyether: 49.8%
aqueous phase: 22.5%
fluorinated surfactants: 27.7%

The microemulsion had a conductance value equal to 21 millisiemens.cm$^{-1}$ at a temperature of 25°.

From the voltametric diagrams, the following $O_2$-reduction density values were obtained:

At 20° C. about 55 $\mu$A mm$^{-2}$ at a working electrode rotational speed equal to zero, and 70 $\mu$A mm$^{-2}$ at $\omega=1500$ rpm, these values being about 28 and 14 times higher than those obtained in aqueous solution;

At 40° C., 90 $\mu$A mm$^{-2}$ at $\omega=0$ and 125 $\mu$A mm$^{-2}$ at $\omega=1500$ rpm were circulating, these values being about 30 and 13 times higher than the corresponding values obtained in aqueous solution In this case, it was possible to obtain a current density of 100 $\mu$A mm$^{-2}$ at 20° C. and at $\omega=1500$ rpm by applying a cathodic potential of 700 mV in $\mu$E and 800 mV in an aqueous solution.

Thus, the $\mu$E made possible a power saving equal to 0.01 $\mu$A mm$^{-2}$.

At 40° C. and at $\omega=1500$ rpm, the same current density of 100 $\mu$A mm$^{-2}$ was obtained at $-300$ mV against $-600$ mV, which are necessary in aqueous solution, resulting in a saving of 0.033 $\mu$A mm$^{-2}$.

EXAMPLE 6

To 40.5 ml of a perfluoropolyether having acid end groups belonging to class 1, having an average equivalent weight of 2860 with respect to the acid groups and an average visosimetric molecular weight of 2080, and being constituted by a mixture of polymers having different molecular weights, neutralized with 13 ml of an NaOH solution having a 2.5M concentration, there were added 20 ml of doubly-distilled water, 4.5 ml of a carboxylic acid having an equivalent weight equal to 668 and 18 ml of a carboxylic acid having an equivalent weight equal to 361, both of them having a perfluoropolyether structure and belonging to class 1.

The resulting system was constituted only by a single limpid phase, which was stable in the temperature range of from 25° to 75° C. and had the following composition by weight:

rough perfluoropolyether: 49.8%
aqueous phase: 22.5%
fluorinated surfactants: 27.7%

The microemulsion exhibited a conductance value equal to 10.5 milliS.cm$^{-1}$ at a temperature of 25° C.

From the voltametric diagrams the following $O_2$-reduction current density values were determined:

At T=20° C.: 38 $\mu$A mm$^{-2}$ without stirring and 65 $\mu$A mm$^{-2}$ at a working electrode rotational speed equal to 1500 rpm, these values being about 19 and 13 times higher than the corresponding values obtained in aqueous solution;

At T=40° C.: 105 $\mu$A mm$^{-2}$ in the absence of stirring and 123 $\mu$A mm$^{-2}$ at $\omega=1500$ rpm, these values being about 35 and 12 times higher than the corresponding values obtained in aqueous electrolyte;

At T=60° C.: 75 $\mu$A mm$^{-2}$ without stirring and 135 $\mu$A mm$^{-2}$ at $\omega=1500$ rpm, the value at $\omega=0$ being about 2.5 times higher than the corresponding value in aqueous solution.

At 20° C. and at $\omega=1500$ rpm, there was obtained a circulation of 80 $\mu$A mm$^{-2}$ at a potential of $-350$ mV in $\mu$E and against $-550$ mV, which are necessary in aqueous solution, the power saving being 0.016 mW mm$^{-2}$.

At 40° C., always at $\omega=1500$ rpm, a circulation of 100 $\mu$A mm$^{-2}$ at a potential of $-200$ mV in $\mu$E and against $-650$ mV, which are necessary in aqueous solution, was obtained, the power saving being, therefore, 0.045 mW/mm$^{-2}$.

At 60° C., there were circulating 150 $\mu$A mm$^{-2}$ at a potential equal to $-300$ mW in $\mu$E, against $-725$ mV, which are necessary with an aqueous electrolyte, the power saving being higher than 0.06 mW/mm$^{-2}$.

EXAMPLE 7

Reference Test

A w/o $\mu$E consisting of 32.98 g of ammonium salt of the surfactant described in Example 1, 58.96 g of a perfluoropolyether having perfluoroalkyl end groups belonging to class 1, and having an average molecular weight of about 800, and 12 ml of water proved to be a limpid and isotropic system at 20° C. and exhibited a specific conductance of 0.2 millisiemens.cm$^{-1}$.

No appreciable current circulation was observed by using this moist $O_2$-saturated $\mu$E as a catholyte; from the current trend on increasing the applied cathodic potential no $H_2$ discharge potential could be determined; in any case, a current density below 0.1 $\mu$A mm$^{-2}$ was obtained in the potential range from $-100$ mV to $-109$ mV.

The same $\mu$E, brought to 40° C., had X=210 milliS.cm$^{-1}$ and permitted the circulation of about 40 $\mu$A mm$^{-2}$ at $-800$ mV.

EXAMPLE 8

Conductive microemulsions based on perfluorocarbons

An amount of 1.26 g of a monocarboxylic acid having a perfluoropolyether structure, belonging to class 1, and having a narrow distribution of molecular weights and an equivalent weight of 520, permitted one to solubilize 0.3 ml of an ammonia solution at 10% by weight of $NH_3$ in 3.80 g of perfluorodecaline, in the presence of 0.39 g of isopropyl alcohol.

By mild magnetic stirring, a limpid and isotropic system at 20° C. was obtained.

The w/o $\mu$E contained 5.2% by weight of microdispersed aqueous phase and exhibited a specific conductance of 1.35 millisiemens.cm$^{-1}$ and an acid pH.

EXAMPLE 9

An amount of 4.04 g of a monocarboxylic acid having a perfluoropolyether structure, belonging to class 1, having an equivalent weight equal to 443 and a narrow distribution of molecular weights, after having been salified with 1.35 g of an ammonia solution at 10% by weight of $NH_3$, were solubilized in 10.27 g of perfluoroheptane. A limpid and isotropic system at 20° C., having a specific conductance of 1.68 mS.cm$^{-1}$ and containing 8.15% of aqueous phase was obtained.

By adding water to the mixture so obtained, the following conductance values were obtained, without macroscopic modifications of the $\mu E$:

| ml $H_2O$ | % by weight W | X (mS · $cm^{-1}$) |
|---|---|---|
| 0.5 | 10.81 | 2.47 |
| 1.1 | 13.84 | 4.14 |
| 2.0 | 18.02 | 6.91 |
| 3.5 | 24.15 | 10.51 |
| 4.5 | 27.75 | 12.41 |

This system was capable of solubilizing at room temperature up to 28% of aqueous phase; at higher concentrations, separation into two phases was observed.

EXAMPLE 10

An amount of 20.2 g of the monocarboxylic acid having the perfluoropolyether structure as described in the preceding example, salified with 1 ml of an ammonia solution at 10% by weight of $NH_3$, permitted one to solubilize 0.3 ml of doubly-distilled water in 3.40 g of perfluoroheptane, in the presence of 0.54 g of a perfluoropolyether-structure alcohol having an average molecular weight equal to 678.

The w/o $\mu E$ so obtained contained 17.92% of aqueous phase and exhibited a specific conductance of 20.6 millisiemens.$cm^{-l}$ at 20° C.

The system was limpid and isotropic at temperatures lower than 27° C. Bringing the aqueous phase content to 19.03% by addition of 0.1 ml of water, a $\mu E$ was obtained which exhibited $X=19.1$ mS.$cm^{-1}$ at 20° C., but wherein the stability range of the limpid and isotropic system was reduced to $T \leqq 21°$ C.

EXAMPLE 11

Use of a $\mu E$ based on perfluorocarbon as a catholyte by reduction of $O_2$

By mixing, at room temperature, 29.25 g of a monocarboxylic acid having perfluoropolyether structure belonging to class 1, having a narrow distribution of the molecular weights and an equivalent weight equal to 448, salified with 14.46 g of an ammonia solution at 10% by weight of $NH_3$, 2 ml doubly-distilled water, 52.07 g of perfluoroheptane, and 8.60 g of a monofunctional alcohol having a perfluoropolyether structure and an average molecular weight equal to 678, there was obtained, under mild stirring, only one limpid and isotropic phase.

The $\mu E$ so prepared was indefinitely stable at 23° C. and had a pH=8.33 and a specific conductance of 44.31 millisiemens.$cm^{-1}$. The aqueous phase content was 15.47% by weight.

This $\mu E$ was utilized as a catholyte in the previously described system, and the behavior at 23° C. was compared:

in equilibrium with air;

under bubbling of moist $N_2$ under bubbling of moist $O_2$.

From the voltametric diagrams, the $O_2$-reduction limit current values, measured at a cathodic potential of 200 mV, which is below the value at which the $H_2$ evolution in the system being examined begins, were determined.

TABLE

| | $\omega$ = 0 rpm | $\omega$ = 1500 rpm |
|---|---|---|
| Air | 23 $\mu A\ mm^{-2}$ | 30 $\mu A\ mm^{-2}$ |
| $N_2$ | 10 $\mu A\ mm^{-2}$ | 10 $\mu A\ mm^{-2}$ |
| $O_2$ | 70 $\mu A\ mm^{-2}$ | 110 $\mu A\ mm^{-2}$ |

The small current circulating $N_2$ bubbling may be due to incomplete $O_2$ removal.

The $O_2$-saturated $\mu E$, at $\omega=1500$ rpm, supported the circulation of an $O_2$-reduction current density more than 20 times higher than that due to the same electrodic reaction in aqueous solution.

The circulation of a current density equal to 100 $\mu A\ mm^{-2}$ at T=23° C. and $\omega=1500$ rpm was observed at a cathodic potential of −680 mCV against −800 mV which are necessary in aqueous solution; thus, a power saving of 0.012 mW/$mm^{-2}$ was obtained.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An electrochemical process comprising reducing oxygen at a cathode using microemulsions of water-in-oil as a catholyte, said microemulsion having an electric conductance by ionic transfer of at least 1 millisiemens $cm^{-1}$ and wherein the microemulsion of the water-in-oil type having a conductant of at least 1 millisiemens $cm^{-1}$ consisting essentially of a liquid, limpid or opalescent, macroscopically single-phase matter obtained by mixing:

(a) an aqueous liquid;

(b) a perfluoropolyether-structured fluid having perfluoroalkyl or functional end groups, with carboxylic, alcoholic, polyoxyalkylene-OH, ester, amide functionally;

(c) a fluorinated surfactant and (d) a hydrogenated alcohol $C_1$–$C_{12}$.

2. The process according to claim 1, wherein the cathode is a metal utilized in voltametric processes.

3. The process according to claim 1, wherein the cathode is Au, Pt or Ni.

4. The process according to claim 1, wherein the fluorinated surfactant is selected from the class consisting of:

(a) salts of the perfluoroalkylcarboxylic acids having 5 to 11 carbon atoms;

(b) salts of the perfluorosulphonic acids having 5 to 11 carbon atoms; and (c) salts of mono- and di-carboxylic acids derived from perfluoropolyethers.

5. The process according to claim 1, wherein the fluorinated surfactant is of the non-ionic type substituted by a perfluoroalkyl chain and by a polyoxyalkylene hydrophilic head.

6. The process according to claim 1, wherein the oil is a perfluorocarbon.

7. The process according to claim 1, wherein the oil is a perfluoropolyether selected from the following classes:

(a) perfluoropolyether having an average molecular weight from 500 to 10,000 with perfluoroalkyl end groups and belonging to one or more of the following classes:

(1)

$$R_fO(\underset{CF_3}{CF}-CF_2O)_n)(\underset{CF_3}{CF}O)_m(CF_2O)_pR'f$$

with a random distribution of the perfluorooxyalkylene units, wherein $R_f$ and $R'_f$, alike or different from each other are, $-CF_3$, $-C_2F_5$, $-C_3F_7$, and m, n, p have average values to meet the above average molecular weight requirements, (2)

$$R_fO(CF_2CF_2O)_n(CF_2O)_mR'_f,$$

with a random distribution of the perfluorooxyalkylene units, where $R_f$ and $R'_f$, alike or different from each other, are $-CF_3$ or $-C_2F_5$ and m and n have mean values to meet the above molecular weight requirements, (3)

$$R_fO(CF_2CF_2O)_n(CF_2O)_m(\underset{CF_3}{CF}O)_p(\underset{CF_3}{CF}-CF_2O)_q-R'f$$

with a random distribution of the perfluorooxyalkylene units, where $R_f$ and $R'_f$, alike or different from each other, are $-CF_3$, $-C_2F_5$, $-C_3F_7$, and m, n, p, q have mean values to meet the above molecular weight requirements, (4)

$$R_fO(\underset{CF_3}{CF}-CF_2O)n-R'_f$$

where $R_f$ and $R'_f$, alike or different from each other, are $-CF_3$ or $-C_2F_5$, and n has mean values to meet the above molecular weight requirements, (5)

$$R_fO(CF_2CF_2O)_nR'_f,$$

where $R_f$ and $R'_f$, alike or different from each other, are $-CF_3$, $-C_2F_5$, and n has a mean value to meet the above molecular weight requirements, (6)

$$R_fO(CF_2CF_2CF_2O)_nR'_f,$$

where $R_f$ and $R'_f$, alike or different from each other, are $-CF_3$, $-C_2F_5$ or $-C_3F_7$, n having a mean value to meet the above molecular weight requirements, (7) perfluoropolyether having the structure of class 1 or class 3, wherein one of end groups $R_f$ and $R'_f$, contains one or two chlorine atoms, (b) perfluoropolyether belonging to the above-described classes, having an average molecular weight ranging from 1,500 to 10,000, characterized in containing on the average from 0.1 to 4 non-perfluoroalkyl end group for each polymeric chain;

(c) perfluoropolyether having functional groups along the perfluoropolyether chain and end groups of the perfluoroalkyl or functional type.

8. The process according to claim 7, wherein perfluoropolyether has an average molecular weight from 600 to 6,000.

9. An electrochemical process according to claim 1, wherein the aqueous liquid includes at least one electrolyte.

10. An electrochemical process according to claim 1, wherein the functional groups of the hydrophilic type, include the carboxylic, the polyoxyalkylene-OH groups, and the carboxylic groups.

11. An electrochemical process according to claim 1, wherein the fluorinated surfactant has perfluoropolyether structure.

12. An electrochemical process according to claim 1 wherein the hydrogenated alcohol contains a fluorinated alcohol as a co-surfactant.

* * * * *